United States Patent
Bhuta et al.

[11] 3,911,733
[45] Oct. 14, 1975

[54] OPTICAL SIGNATURE METHOD AND APPARATUS FOR STRUCTURAL INTEGRITY VERIFICATION

[75] Inventors: Pravin G. Bhuta; David A. Evensen, both of Torrance; Edmund K. Burchman, Los Alamitos, all of Calif.

[73] Assignee: TRW Inc., Redondo Beach, Calif.

[22] Filed: Apr. 1, 1974

[21] Appl. No.: 456,998

[52] U.S. Cl. .................. 73/88 A; 73/67.3; 73/91
[51] Int. Cl.² ........................................ G01N 3/32
[58] Field of Search ........... 73/88 A, 91, 67.3, 100; 356/71

[56] References Cited
UNITED STATES PATENTS
3,136,154  6/1964  Christansen .................. 73/91 UX
3,631,713  1/1972  Marom ........................ 73/67.3

*Primary Examiner*—Jerry W. Myracle
*Attorney, Agent, or Firm*—Daniel T. Anderson; Donald R. Nyhagen; Edwin A. Oser

[57] ABSTRACT

The structural integrity of a load bearing structure is periodically evaluated by recording on the same holographic recording medium two successive holograms of the structure while the latter is in two different stress conditions, respectively, to produce a holographic interferogram which may be reconstructed to create a deformation fringe pattern representing the deformations in the structure resulting from the change in the stress conditions. This deformation pattern is compared with an earlier deformation pattern of the structure resulting from the same stress conditions to determine differences, if any, between the two patterns, such differences being indicative of a reduction in the stiffness and hence structural integrity of the structure due to weakening of the latter by fatigue damage, stress corrosion cracking, and/or other causes.

22 Claims, 6 Drawing Figures

OPTICAL SIGNATURE METHOD AND APPARATUS FOR STRUCTURAL INTEGRITY VERIFICATION

BACKGROUND OF THE INVENTION

1. Field of the Invention:

This invention relates generally to the art of nondestructive inspection and more particularly to a novel nondestructive inspection method and apparatus utilizing holographic interferometry for evaluating the structural integrity of load bearing structures.

2. Prior Art:

As will become readily apparent from the ensuing description, the nondestructive inspection technique of this invention may be utilized to evaluate the structural integrity of virtually any structure. The invention is particularly useful for evaluating the integrity of redundant load bearing structures, however, that is load bearing structures having multiple load paths. For this reason, the invention will be described in connection with its application to evaluating the structural integrity of such a redundant load bearing structure, specifically an aircraft wing structure. In view of the above noted broader utility of the invention, it will be understood, of course, that the described application involving aircraft wing inspection is purely illustrative and not limiting in nature.

An aircraft wing is a highly redundant load bearing structure having multiple internal load bearing members providing multiple load paths through the structure. The wing structure is designed to sustain loads substantially in excess of those which are encountered in normal aircraft service. Over a period of time, however, a wing structure is prone to loss of its structural integrity, that is weakening of its load bearing members due to fatigue damage, stress corrosion cracking, and other causes. Fatigue damage, of course, involves cracking of the wing load bearing members, loosening of joints and rivets, and other weakening of the wing structure caused by the frequent load reversals which occur in the structure during flight, landing, and takeoff. Stress corrosion cracking occurs in aircraft which operate in an ocean environment and is caused by the corrosive action of salt water. In order to assure continued safe aircraft operation, therefore, it is necessary to periodically evaluate the structural integrity of aircraft wings, as well as other parts of the aircraft, of course.

A variety of inspection and testing techniques have been devised to evaluate the structural integrity of aircraft wings and other aircraft parts. One common inspection technique, for example, involves installing accelerometers on selected structural members for counting stress reversals experienced by the members. From these counts and a statistical model based on the behavior of the particular aircraft structure of interest and statistical considerations regarding the distribution and size of defects, fatigue damage may be predicted. At appropriate times, the wing structure may be disassembled and subjected to actual fatigue inspection using x-rays or other nondestructive inspection techniques and/or fatigue damage tests. This method of evaluating structural integrity, however, is extremely costly and time consuming. The same applies to the current methods of inspecting aircraft wings and other structures for stress corrosion cracks, which methods require stripping all paint from the surfaces to be inspected, inspection of the surfaces by ultrasonic or other inspection techniques, and repainting of the surfaces. Accordingly, there is a need for an improved nondestructive inspection technique for evaluating the structural integrity of load bearing structures, particularly highly redundant load bearing structures, such as aircraft wings and other aircraft structures and parts.

SUMMARY OF THE INVENTION

This invention provides such an improved inspection technique, involving holographic interferometry. The improved inspection technique is based on the fact that any loss of structural integrity, that is weakening, of a load bearing structure due to fatigue damage, stress corrosion cracking, or other causes reduces the effective stiffness of the structure. This reduction in stiffness, in turn, changes the distortions which the structure will experience in response to any given loading or stressing of the structure. The present inspection technique utilizes holographic interferometry to detect such changes in distortion and thereby changes in the structural integrity of the test structure.

According to the invention, a load bearing structure is periodically inspected by establishing in the structure two successive predetermined stress conditions of differing magnitude and recording on the same holographic recording medium a first hologram of the structure while the latter is in one stress condition and a second hologram of the structure while the latter is in the other stress condition. The resulting hologram recorded on the recording medium is an interferogram which may be holographically constructed to produce a deformation fringe pattern whose fringe lines depict or represent the deformations occurring in the structure due to the change from one stress condition to the other. This deformation pattern is compared to an earlier deformation pattern of the structure produced with the same stress conditions to determine any differences in the patterns. Differences, if any, between the patterns are indicative of a change in the structural integrity of the structure in the interval between recording of the two interferograms.

The two stress conditions required for each periodic inspection of the structure may be established by either or both static or dynamic loading of the structure. According to the static loading procedure, the structure to be inspected is subjected to a given static load, which may be simply the weight of the structure or an additional static load, during recording of the first hologram. The static load on the structure is then changed and the second hologram is recorded. According to the dynamic loading procedure, an impact or impulsive load is applied to the structure to effect propagation of stress waves through the structure. These stress waves establish a first stress in the structure when the first hologram is recorded and a second stress condition when the second hologram is recorded. According to the combined static and dynamic loading procedure, the structure is subjected to a constant static load in addition to the impulsive load.

As noted earlier, the invention will be described in connection with its application to aircraft wing inspection. In this particular application, the wings of an aircraft are inspected at regular intervals and the aircraft is placed into normal flight service after each inspection, such that the wings are subjected to flight, landing, and takeoff loads and stresses in the periods between inspections. Accordingly, a series of deformation patterns of the wings are generated which permit effective monitoring of the structural integrity of the wings. The loads exerted on the wings for inspection purposes are related to their normal flight loading. A primary advantage of the invention in this application resides in the ability to evaluate the wing integrity without disassembly of the wings or removal of paint from the wing surfaces. The invention also provides a portable holographic inspection apparatus for practicing the inspection technique of the invention.

DESCRIPTION OF THE PREFERRED EMBODIMENTS

Figure 1:
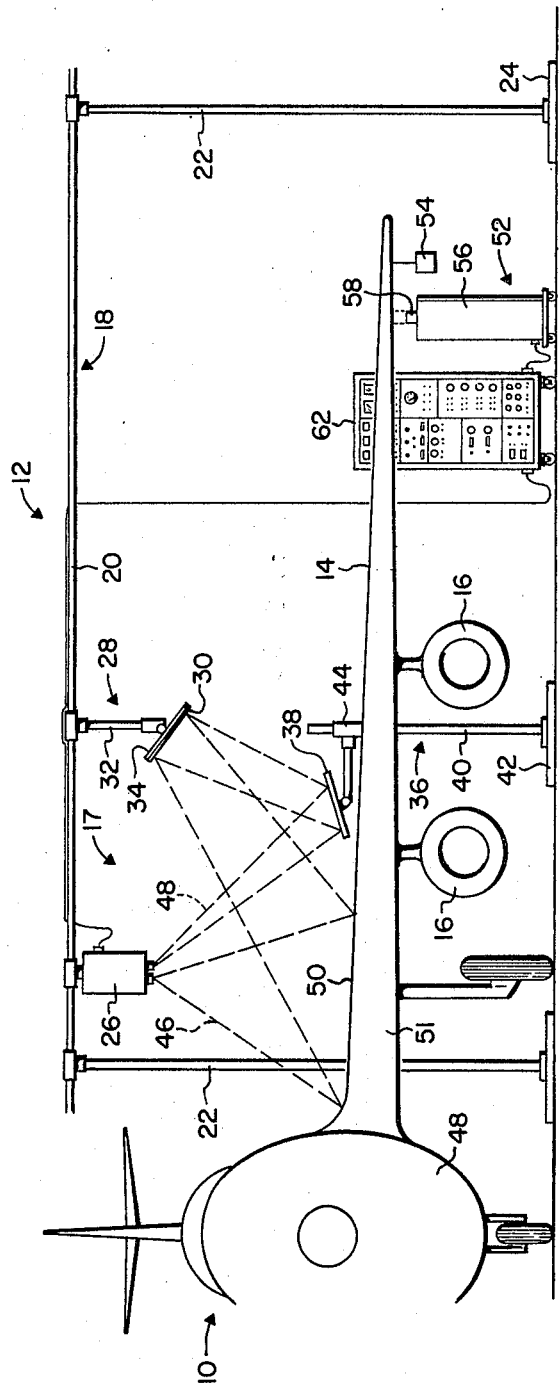
FIG. 1 illustrates inspection apparatus according to the invention set up for inspecting the root section of an aircraft wing.

Referring first to FIG. 1, there is illustrated an airplane 10 and inspection apparatus 12 according to the invention for periodically evaluating the structural integrity of the airplane wing 14. Attached to the underside of the wing are engines 16. Before describing the inspection apparatus 12, it is well to consider the structural and deformation characteristics of such a wing.

Figure 1A:
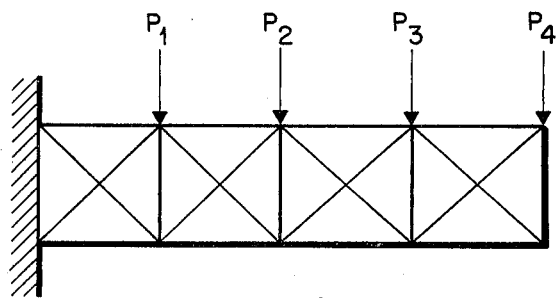
FIG. 1A is a simplified load diagram of the wing.

The simplest structural model for the wing is a cantilever beam, but such a model is clearly inadequate for understanding fatigue of the wing. In reality, the wing is a complex, redundant structure, with multiple load paths. A simplified example of such a redundant structure is sketched in FIG. 1A.

The deflection of such a redundant structure can be computed from the matrix equation $$[K]\vec{u} = \vec{P}$$

(1)

where $\vec{P}$ is the load vector, $\vec{u}$ the displacement vector, and K is the stiffness matrix, which depends upon the stiffness of the individual members, i.e., the members of the truss (or wing) have individual area $A_i$, length $l_i$, modulus $E_i$, etc., which contribute to the individual stiffnesses and influence the matrix elements $[k_{ij}]$.

When the structure is "brand-new," the original stiffness matrix is $[K_o]$, and a set of loads $\vec{P}$ produces a certain deflection pattern characterized by $\vec{u_o}$.

$$[K_o]\vec{u_o} = \vec{P}$$
$$\vec{u_o} = [K_o]^{-1}\vec{P}$$

(2)

Now suppose the wing structure is subjected to many loading cycles, and fatigue cracks being to develop in one or more of the wing load carrying members. One effect of these fatigue cracks is to change the effective stiffness of the load-carrying members. For example, the effective cross-sectional area $A_i$ of the fatigued members might decrease. In this case, the individual stiffness of the members will change to $(k_{ij} + \delta k_{ij})$ where $\delta k_{ij}$ is the change in stiffness. Then the stiffness matrix becomes $$[K'] = [K_o] + [\delta K]$$

(3)

for the "used" structure and Equation (1) then becomes $$[K']\vec{u} = \vec{P} = \{[K_o] + [\delta K]\}\vec{u} = \vec{P}$$

(4)

which can be solved for the deflection $$\vec{u'} = \vec{u_o} + \vec{\delta u}$$

(5)

where $\vec{\delta u}$ is the change in the displacement or distortion vector (which results from the change in stiffness $\delta K$ due to fatigue effects).

The basic aim of the present nondestructive inspection method is to detect this change $\vec{\delta u}$ in displacement or distortion. Since holographic interferometry is very sensitive to small changes in displacement, it is an ideal tool to use for detection $\vec{\delta u}$.

For example, assume a brand new wing structure is loaded by a static load vector, $\vec{P_s}$, which produces a displacement $\vec{u_s}$ and that a first hologram of the wing is recorded on a holographic recording medium while under such load. Assume further that the wing load is changed by an amount $\Delta P_s$ and a second hologram of the wing is recorded on the same recording medium. The resulting double-exposed medium or hologram constitutes an interferogram which contains or records holographic information representing the incremental wing distortion or displacement $\Delta u$ produced by the load change $\Delta P_s$. This incremental displacement may be termed the displacement signature of the wing at the load $\vec{P_s}$. This signature may be observed by holographically reconstructing the interferogram to produce a holographic image of the wing containing fringe lines representing the incremental displacements or distortions $\Delta u$ produced in the wing by the load change $\Delta P_s$. In the present description, this holographic image is referred to as a deformation fringe pattern or simply a deformation pattern.

Assume now that the aircraft is placed in service for a period of time, such that the aircraft wing experiences many stress cycles, i.e., stress or load reversals, and that the stiffness of the wing changes because of fatigue cracking and/or other causes. Assume further that following such service period the aircraft is brought in for inspection, loaded to the same static load, $\vec{P_s}$, and then its response $\Delta u'$ to the same load increment $\Delta P_s$ is again recorded with double-exposure holography. Now, since the structural stiffness of the wing has changed due to fatigue, its "signature" $\Delta u'$ is not identical with the original signature $\Delta u$. The difference in signature (mathematically $\Delta u' - \Delta u$) can be used as a measure of the change in stiffness $(K_o + \delta K)$ and is related to fatigue damage in the structure.

The signature difference $\Delta u' - \Delta u$ can be observed by holographically reconstructing the second double-exposed hologram or interferogram to produce a second deformation pattern of the wing and comparing the latter pattern with the first deformation pattern of the wing. Any difference between these patterns, that is any difference between the number, shape, width, and/or spacing of their fringe lines, is indicative of a change in the wing signature, i.e., incremental displacement produced by the load change $\Delta P_s$, and hence of a change in the wing stiffness. A change in the wing stiffness, in turn, indicates that the wing has been weakened by fatigue damage or other causes.

The foregoing discussion effectively summarizes one nondestructive inspection technique according to this invention for evaluating the structural integrity of an aircraft wing. As noted earlier, of course, and as will be evident from the discussion, the same technique may be used to evaluate the structural integrity of virtually any structure.

It will be apparent to those versed in the art that the above technique suffers from one disadvantage. This disadvantage, which may not exist in all applications of the invention, resides in the fact that the test structure and holography apparatus must remain absolutely stationary during the recording of each double-exposed hologram or interferogram for reasons which are obvious to those familiar with holography.

An alternative and preferred inspection procedure, which avoids the foregoing disadvantage, involves dynamic or both static and dynamic loading of the test structure. This dynamic loading inspection technique is explained below. Suffice it to say at this point that the dynamic technique, while fundamentally equivalent to the static loading technique and yielding essentially the same deformation patterns as the static technique, permits the use of pulsed laser holography to produce the inspection interferograms and thereby avoids the above noted disadvantage of the static technique.

Moreover, when the load-deflection curve of the test structure is nonlinear, the dynamic inspection technique will give a measure of the "incremental" stiffness matrix $$[K_i] = (\Delta P)(\Delta u)^{-1}$$

which is load-dependent. From a practical standpoint, the application of a static load related to the normal service load of the test structure in addition to the dynamic load on the structure will serve to open up fatigue cracks, etc., and thereby yield a more accurate evaluation of the actual stiffness of the structure at the operating load point.

The preferred dynamic load inspection technique of the invention will now be explained by reference to FIG. 1. The inspection apparatus 12 illustrated in the figure is designed to record the successive interferograms of the aircraft wing 14 from which are reconstructed the deformation patterns for evaluating the structural integrity of the wing, or more correctly detecting any changes in the wing stiffness over a period of time.

The illustrated inspection apparatus 12 comprises a pulsed laser holographic apparatus 17 including a supporting frame 18, which is preferably portable. The particular support frame shown has a horizontal rail 20 supported at its ends on standards 22 with enlarged bases 24 for resting on the floor. It will be understood that the support frame 18 will be constructed and arranged to be sufficiently rigid and stable to enable operation of the apparatus in the manner explained later.

Slidably supported on the rail 20, for adjustment along and rotation about the rail, are a laser 26 and a holder 28 for a holographic recording plate 30. The plate holder 28 comprises a hanger 32 slidably mounted at its upper end on the rail 20. Swivelled on the lower end of the hanger is an adjustable support 34 for the holographic plate 30.

The holographic apparatus 17 also includes a support 36 for a mirror 38. Mirror support 36 comprises a standard 40 with a large base 42 for resting on the floor. Vertically adjustable along the standard 40 is a horizontal bracket 44. Mirror 38 is swivelled on the outer end of the bracket for adjustment of the mirror relative to the mirror support.

Laser 26 is a pulsed laser, such as a pulsed ruby laser, including optics (now shown) for splitting the laser beam into a divergent coherent scene beam 46 and a divergent coherent reference beam 48. The laser optics are arranged to project these beams along divergent paths, as shown, and may be adjustable to change the beam directions.

Holographic apparatus 17 is positioned in accordance with the particular structural area to be inspected. In FIG. 1, for example, the area to be inspected is the upper surface area 50 of the wing root region 51. The apparatus 17 is set up along the trailing edge of the wing with the support frame 18 extending lengthwise of the wing and the left-hand frame standard positioned close to the aircraft fuselage 48. The laser 26 is placed at the left end of the frame rail 26 and adjusted so that its scene beam 46 illuminates the wing root surface area 50. The holographic plate 30 is placed to receive from the surface coherent light of the scene beam. The mirror 38 is positioned in the path of the reference beam 48 and adjusted to reflect this beam to the plate 30. It will be understood, of course, that the laser, holographic plate, and mirror are located to attain the proper path lengths of the scene and reference beams. Accordingly, each time the laser 26 is pulsed, a hologram of the wing surface area 50 is recorded on the holographic recording plate.

In addition to the holographic apparatus 17, the inspection apparatus 12 includes means 52 for both statically and dynamically loading or stressing the wing 14. Wing loading means 52 comprises a weight 54 which is suspended from the wing tip for exerting a static load on the wing and an impulsive loading device 56 for applying an impulse to the wing. The weight 54 is selected to exert a static load which is an arbitrary fraction of the normal static load on the wing in flight. The impulsive loading device 56 has a plunger 58 and electrically actuated means for driving the plunger into impact with the wing 14 to apply an impulse to the wing. This means may be a solenoid, a pneumatic actuator controlled by a solenoid valve, or other suitable electrically actuated means. Each such impulse causes stress waves to propagate along the wing.

The impulsive loading device 56 may be supported in any convenient way relative to the wing 14. The particular device shown is designed to be supported on the floor below the wing tip in such a way that when the device is electrically actuated, its plunger 58 is driven upwardly into impact with the underside of the wing tip. The plunger is returned by gravity or spring action.

Figure 1B:
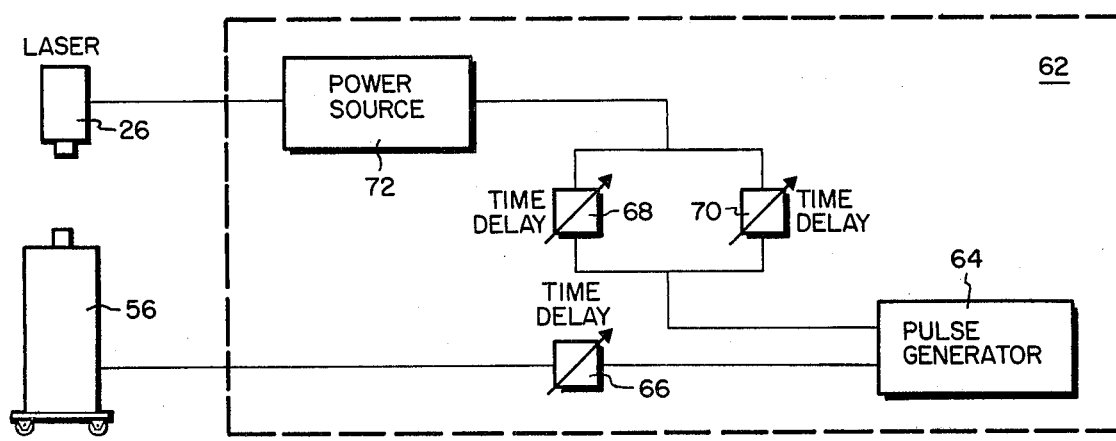
FIG. 1B is an electrical circuit diagram of the wing.

Laser 26 and impulsive loading device 56 are actuated in timed relation by a control unit 62. Referring to FIG. 1B, the control unit 62 comprises an electrical pulse generator 64 which is electrically connected through an adjustable time delay circuit 66 to the wing loading device 56 and through two parallel adjustable time delay circuits 68, 70 to the laser power supply 72. The control unit 62 is selectively operable to effect generation of a single output pulse by the pulse generator 64. This output pulse is transmitted to the loading device and power supply through the delay circuits. Delay circuits 68, 70 are set to different time delays, such that the laser power supply 72 receives two successive input pulses. Each input pulse triggers the power supply to pulse the laser 26, whereby each actuation of the control unit 62 pulses the laser twice. The input pulse arriving at the loading device 56 through the delay circuit 66 effects actuation of the device to extend its plunger 58 into impact with the wing 14.

The time delay circuits 66, 68, and 70 are adjusted to provide time delays such as to effect pulsing of the laser 26 and the wing loading device 56 in predetermined timed relation, as explained below. Each such timed operation of the laser and loading device occasioned by actuation of the control unit 62 is hereafter referred to as an exposure cycle of the inspection apparatus 12. Thus, each actuation of the control unit effects one exposure cycle of the apparatus.

The operation of the inspection apparatus will now be explained. Assuming the apparatus to be placed in the proper position relative to the aircraft wing 14, the weight 54 is applied to the wing tip to exert a static preload on the wing. This preload and the weight of the wing, engines 16, and any other loads on the wing establish an initial static load or stress condition within the wing root region 51.

An exposure cycle of the inspection apparatus 12 is now initiated by actuation of the control unit 62. In the course of this cycle, the laser 26 and wing loading device 56 are pulsed in timed relation to effect recording on the holographic recording plate 30 two successive holograms of the wing surface area 50 and to produce on the wing 14 stress waves which propagate along the wing from its tip through the wing root region 51 containing the surface area 50. These stress waves cause deflection of the wing and produce within its root region, which is already preloaded to an initial stress condition as explained earlier, a dynamic incremental load or stress. In other words, during the course of the exposure cycle, an initial stress condition exists in the wing root region at the start of the cycle and a different stress condition exists in the root region as the stress waves propagate through the region. The incremental stress change which thus occurs within the root region produces within the region an incremental displacement or distortion of the wing structure related to the effective stiffness of the structure.

According to the present invention, pulsing of the laser 26 to record the two holograms and pulsing of the wing loading device 56 to produce a dynamic incremental load on the wing are so timed, by appropriate adjustment of the time delay circuits 66, 68, and 70 that the first hologram is recorded when the wing root region is in one stress condition and the second hologram is recorded when the wing root region is in another stress condition. The resulting double exposed hologram is thus an interferogram containing holographic information representing the deformation or displacement signature of the wing, that is the incremental wing deformation or displacement of the wing, within its root surface area 50, resulting from the difference in the stress conditions existing within the wing root region 51 at the instants of recording the two holograms.

As noted earlier, the above inspection procedure is repeated periodically during the service life of the aircraft to create a collection of successively recorded interferograms representing successive displacement signatures of the wing 14. Each signature is compared with the earlier recorded signatures by holographically reconstructing and comparing their deformation patterns to determine any changes in the signatures, i.e. patterns. Such differences, if any, indicate a change in the structural integrity of the wing. Serious wing damage may be ascertained by proper analysis of the signatures, thus permitting more extensive wing inspection by disassembly and x-ray inspection and wing repair or replacement only when indicated to be necessary by holographic inspection.

It will be apparent that the two successive holographic exposures during each wing inspection exposure cycle may be made at various times in the cycle and that the differing stresses existing in the wing root region 51 during the two exposures will depend on the timing of the exposures. That is to say, the two exposures may be made at various times relative to the propagation of the impulsively produced stress waves along the wing. According to the preferred practice of the invention, the first exposure is made prior to arrival of the stress waves at the wing root region and the second exposure is made at the instant of passage of the waves through this region.

Figure 4:
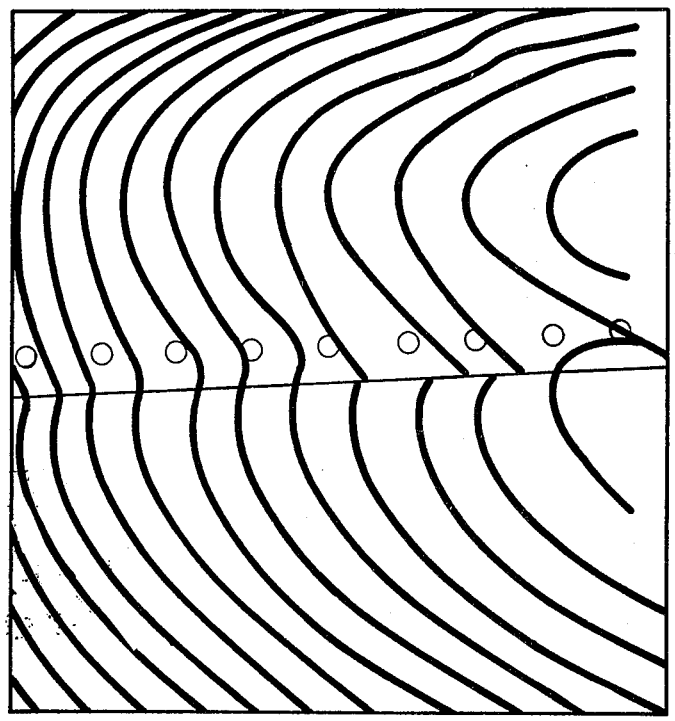
FIG. 4 illustrates a simple deformation pattern produced by the invention.

Attention is now directed to FIG. 4 when depicts a deformation pattern such as might be produced by the practice of this invention. This pattern had deformation fringe lines $f$ crossing a lap joint between riveted panels P. This pattern is compared with an earlier deformation pattern of the structure being inspected to determine any changes in the pattern indicating a change in the stiffness and hence structural integrity of the structure. As noted earlier, such pattern changes may take the form of changes in the number, shape, spacing, width, or other characteristics of the fringe lines $f$. It will be apparent, of course, that each pattern may be analyzed individually in the well known way to detect cracks, loose rivets, and other damage. In FIG. 4, for example, the discontinuity of the fringe lines in the region R indicate such damage.

Figure 2:
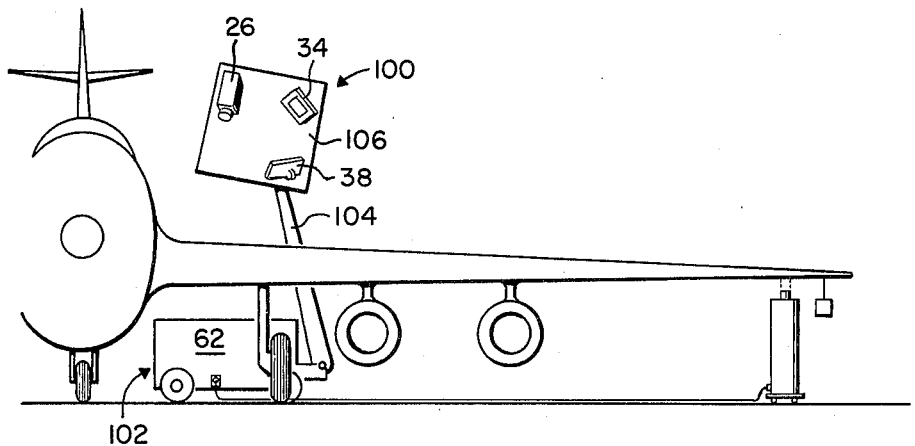
FIG. 2 illustrates a modified inspection apparatus set up for inspecting an aircraft wing root section.
Figure 3:
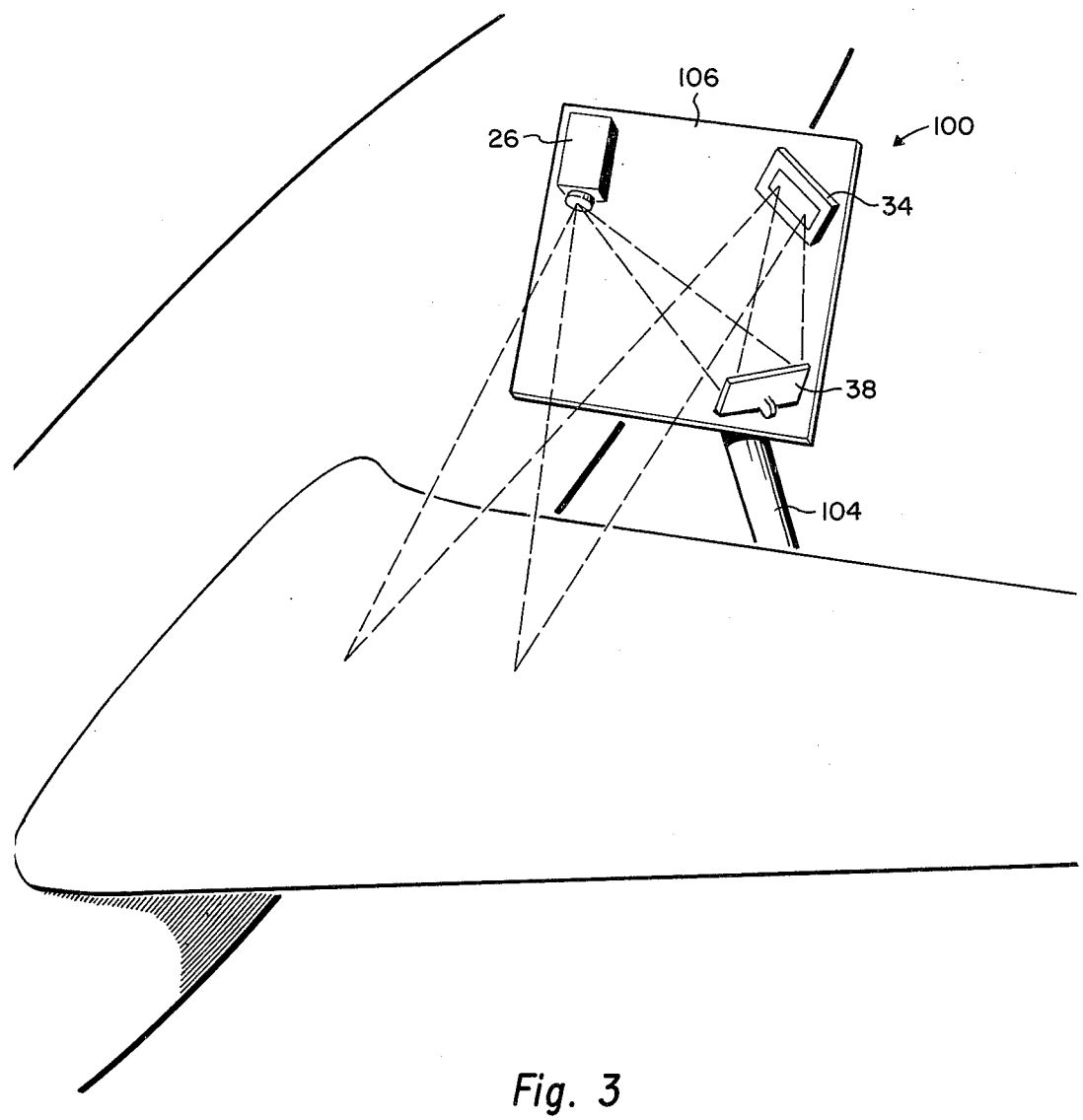
FIG. 3 is an enlarged fragmentary perspective view of the structure in FIG. 2.

FIGS. 2 and 3 illustrate a modified holographic inspection apparatus 100 according to the invention. This modified apparatus includes the laser 26, mirror 38, holographic plate holder 34, and control unit 62 of the inspection apparatus shown in FIG. 1. The modified apparatus further comprises a wheeled vehicle 102 mounting the control unit 62 and a hinged boom 104 which is vertically adjustable by hydraulic means (not shown). Swiveled on the upper end of the boom is an adjustable platform 106. The laser 26, mirror 38, and plate holder 34 are adjustably mounted in any convenient way on this platform in the positions shown, such that by proper placement of the vehicle 102 and adjustment of the boom 104, platform 106, laser 26, mirror 38, and plate holder 34, the apparatus 100 may be arranged to record holograms of the structure to be inspected. In FIGS. 2 and 3, for example, the apparatus is set to inspect the root portion of an aircraft wing 14. The modified apparatus operates and is used in the same manner as the inspection apparatus of FIG. 1.

We claim:

1. The method of nondestructively evaluating the structural integrity of a load bearing structure comprising the steps of:

recording on a first holographic recording medium a first hologram of said structure while the latter is in a first stress condition and a second hologram of said structure while the latter is in a second stress condition to produce a first holographic interferogram for reconstructing a first holographic deformation pattern of the structure; and thereafter recording on a second holographic recording medium a first hologram of said structure while the latter is in said first stress condition and a second hologram of said structure while the latter is in said second stress condition to produce a second holographic interferogram for reconstructing a second holographic deformation pattern of the structure which may be compared with said first deformation pattern to detect differences, if any, in the patterns, such differences being indicative of changes in the structural integrity of said structure in the interval between recording of said interferograms.

2. The method of claim 1 including the additional step of:

stressing said structure in the interval between recording of said interferograms.

3. The method of claim 1 including the additional step of:

subjecting said structure to variable stress in the interval between recording of said interferograms.

4. The method of claim 1 wherein:

said stress conditions are created by static loading of said structure.

5. The method of claim 1 wherein:

said stress conditions are created by subjecting said structure to a first static load during recording of each first hologram and to a second static load during recording of each second hologram.

6. The method of claim 1 wherein:

said stress conditions are created by impulsive loading of said structure.

7. The method of claim 1 wherein:

said stress conditions are created by applying an impulsive load to said structure in such a way as to propagate stress waves through said structure, and recording each set of first and second holograms in rapid succession, whereby said stress waves establish said first stress condition on the structure during recording of the first hologram and said second stress condition in the structure during recording of the second hologram.

8. The method of claim 1 wherein:

said stress conditions are created by combined static and impulsive loading of the structure.

9. The method of claim 8 wherein:

said structure is impulsively loaded by applying an impulsive load to said structure in such a way as to propagate stress waves through said structure, and recording each set of first and second hologram in rapid succession, whereby said stress waves establish said first stress condition on the structure during recording of the first hologram and said second stress condition in the structure during recording of the second hologram.

10. The method of claim 1 wherein:
said structure is an aircraft structure; and
said method comprises the additional step of subjecting said structure to variable stress cycles in the interval between recording of said interferograms.

11. The method of claim 10 wherein:

said structure is subjected to said stress cycles by flying the aircraft during said interval.

12. The method of claim 10 wherein:
said stress conditions are created by static loading of said structure.

13. The method of claim 10 wherein:
said stress conditions are created by subjecting said structure to a first static load during recording of each first hologram and to a second static load during recording of each second hologram.

14. The method of claim 10 wherein:
said stress conditions are created by impulsive loading of said structure.

15. The method of claim 10 wherein:
said stress conditions are created by applying an impulsive load to said structure in such a way as to propagate stress waves through said structure, and recording each set of first and second holograms in rapid succession, whereby said stress waves establish said first stress condition in the structure during recording of the first hologram and said second stress condition in the structure during recording of the second hologram.

16. The method of claim 10 wherein:
said stress conditions are created by combined static and impulsive loading of the structure.

17. The method of claim 16 wherein:
said structure is impulsively loaded by applying an impulsive load to said structure in such a way as to propagate stress waves through said structure, and recording each set of first and second holograms in rapid succession, whereby said stress waves establish said first stress condition in the structure during recording of the first hologram and said second stress condition in the structure during recording of the second hologram.

18. The method of claim 10 wherein:
said stress conditions are created by combined static and impulsive loading of the aircraft structure to simulate the stress on said structure at the instant of touchdown of the aircraft during landing; and
said structure is impulsively loaded by applying an impulsive load to said structure in such a way as to propagate stress waves through said structure, and recording each set of first and second holograms in rapid succession, whereby said stress waves establish said first stress condition in the structure during recording of the first hologram and said second stress condition in the structure during recording of the second hologram.

19. Apparatus for nondestructively evaluating the structural integrity of a structure comprising:
a holographic system including a laser for recording on the same holographic recording medium successive holograms of the structure;
means for impulsively loading said structure; and
means for operating said system and loading means in timed relation in such a way as to record on said medium a first hologram of said structure while the latter is in one stress condition and a second hologram of said structure while the latter is in a second stress condition.

20. Apparatus according to claim 19 including:
a wheeled vehicle carrying said holographic system.

21. Apparatus according to claim 20 wherein:
said vehicle includes an adjustable boom mounting said holographic system.

22. Apparatus according to claim 21 wherein:
said vehicle further includes an adjustable platform on said boom supporting said holographic system.

* * * * *